United States Patent [19]
Garry

[11] Patent Number: 5,733,612
[45] Date of Patent: Mar. 31, 1998

[54] FLOWER ARRANGEMENT KIT

[76] Inventor: Richard Michael Garry, 801 Northwest Cedar Creek La., Lee's Summit, Mo. 64081

[21] Appl. No.: 681,672

[22] Filed: Jul. 29, 1996

[51] Int. Cl.[6] .................................................. A47G 7/00
[52] U.S. Cl. ........................ 428/23; 156/63; 206/423; 428/24; 434/93
[58] Field of Search .................. 428/23, 24; 156/63; 206/423; 434/93

[56] References Cited

U.S. PATENT DOCUMENTS

| | | | |
|---|---|---|---|
| 2,981,033 | 4/1961 | Cheetwood | 428/23 X |
| 3,144,932 | 8/1964 | Zerbo, Jr. | 428/24 X |
| 3,243,895 | 4/1966 | Girard | 428/27 X |
| 4,600,612 | 7/1986 | Litwin et al. | 428/23 |
| 4,606,950 | 8/1986 | Corbet | 428/23 |
| 4,937,109 | 6/1990 | Lin | 428/23 |
| 5,453,308 | 9/1995 | Myers | 428/24 |

*Primary Examiner*—Henry F. Epstein
*Attorney, Agent, or Firm*—Litman, McMahon & Brown, L.L.C.

[57] ABSTRACT

An artificial flower arrangement kit including a flower matching template with separate, full scale pictorial representations of the flowers to be utilized in the kit and a matching numeral associated with each pictorial representation wherein the matching numeral corresponds to a placement numeral associated with a placement marking on a placement template. The placement template is sized for placement on an upper surface of a foam block into which the flowers are to be inserted through the placement template. The pictorial representations are preferably arranged on the matching template in ascending order corresponding with the order in which the flowers are to be inserted into the mounting block.

18 Claims, 2 Drawing Sheets

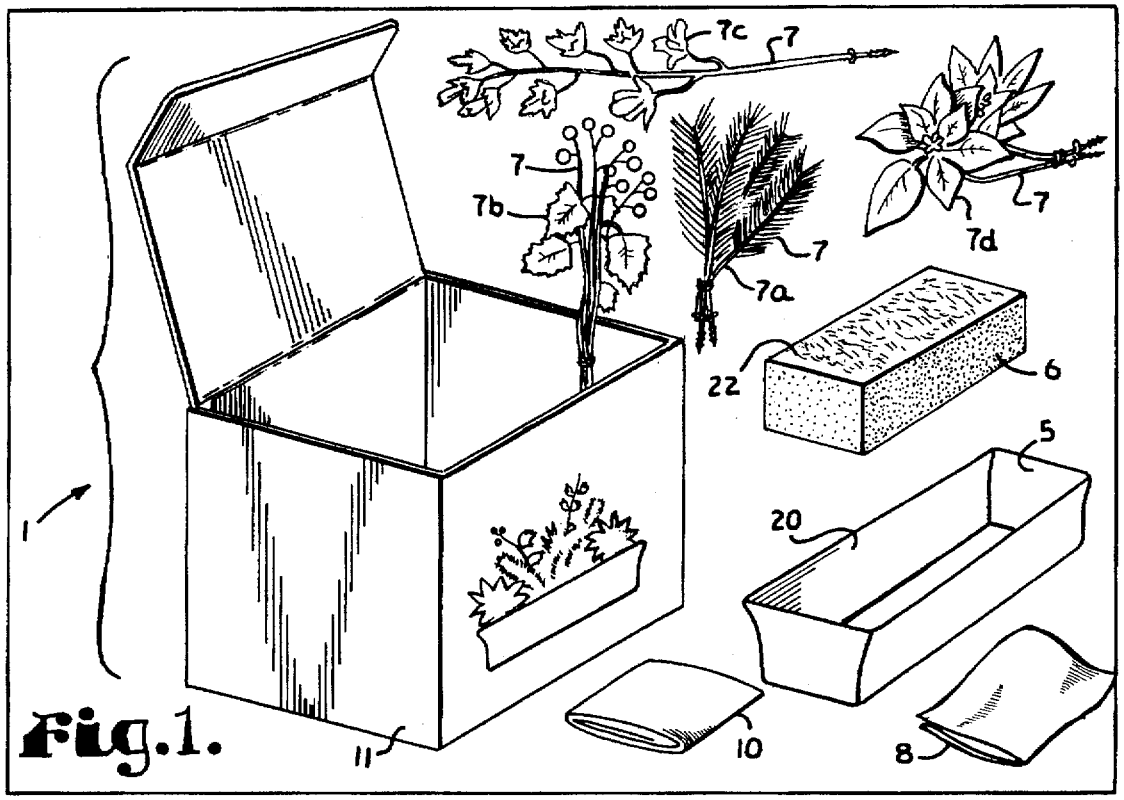

Fig.1.

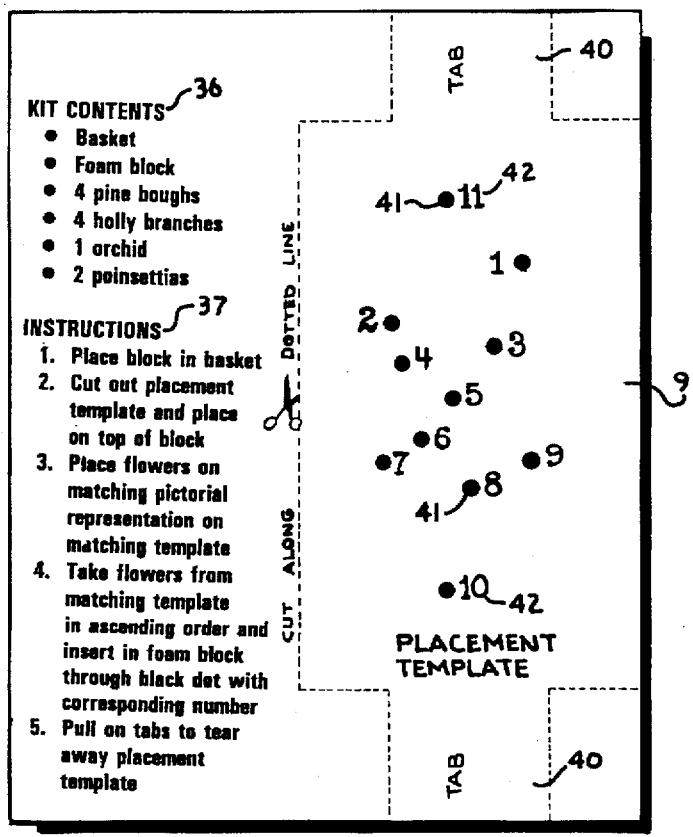

Fig.2.

KIT CONTENTS — 36
- Basket
- Foam block
- 4 pine boughs
- 4 holly branches
- 1 orchid
- 2 poinsettias

INSTRUCTIONS — 37
1. Place block in basket
2. Cut out placement template and place on top of block
3. Place flowers on matching pictorial representation on matching template
4. Take flowers from matching template in ascending order and insert in foam block through black dot with corresponding number
5. Pull on tabs to tear away placement template

PLACEMENT TEMPLATE

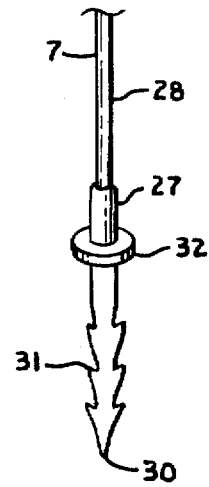

Fig.3.

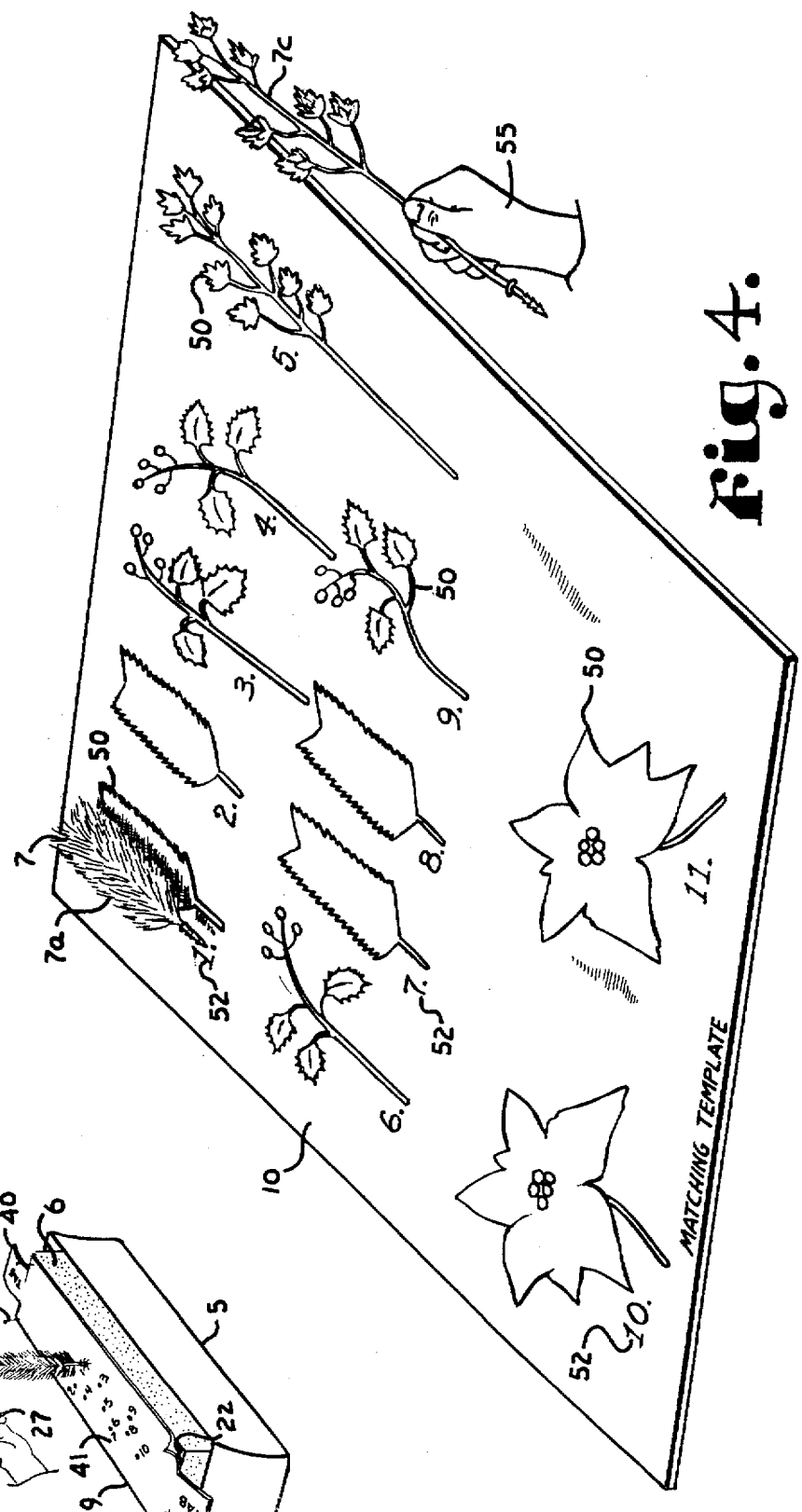

5,733,612

FLOWER ARRANGEMENT KIT

BACKGROUND OF THE INVENTION

Artificial flower arrangements have become increasing popular as improvements in artistry, technology and materials has increased the ability of manufacturers to produce higher quality and more life like artificial flowers. Artificial flower arrangement kits have been developed which generally provide all or most of the materials which are necessary to assemble a pre-designed flower arrangement along with instructions on assembling the arrangement. Such kits are advantageous for mass marketing purposes in that they can be packaged in smaller containers making them cheaper to ship and taking up less shelf space than pre-assembled arrangements. Marketing the arrangement as a kit also reduces the cost of the arrangement through reduced labor charges.

Many of the prior art kits incorporate a placement template which can be placed over a foam block into which the ends of artificial flower stems are to be inserted for support thereby. Such placement templates typically include spots thereon with an associated indicia or symbol or combination of symbols. Various instructions or systems are then utilized in the prior art kits to instruct or guide the assembler in placing the appropriate artificial flower in the foam block through the appropriate dot in the placement template. However, the assembly systems used in existing kits are somewhat time consuming, awkward or confusing. Improvements in artificial flower arrangement kits which simplify and make nearly fool-proof the assembly of the arrangement continue to be desirable for marketing purposes and customer satisfaction.

SUMMARY OF THE INVENTION

The present invention comprises an artificial flower arrangement kit incorporating a flower matching template with full scale pictorial representations of the flowers to be utilized in the kit and which is used in combination with a placement template to greatly simplify the process of assembling the arrangement.

The placement template is sized for placement on an upper surface of a foam block into which the flowers are to be inserted. Placement markings are printed on the placement template to indicate the spot where flowers are to be inserted into the foam block through the placement template positioned thereon. A number, from 1 to the number of flowers to be used, is printed in close proximity to each of the placement markings.

The matching template preferably includes a separate full scale pictorial representation of each flower to be utilized in the arrangement in spaced apart relation and with a number associated therewith corresponding with the numbers on the placement template. The pictorial representations are preferably arranged on the matching template in ascending order corresponding with the order in which the flowers are to be inserted into the mounting block.

The kit also preferably includes the flowers to be utilized, a foam mounting block, a receptacle such as a basket or vase, instructions and a picture of the completed arrangement. The instructions provide step by step instructions in assembling the arrangement.

To assemble the arrangement, the foam mounting block is inserted into the receptacle and the placement template is positioned on an upper surface of the mounting block. The matching template is laid out on a flat surface. Each flower is then matched with a pictorial representation on the template and placed thereon until all of the pictorial representations on the matching template have a matching flower positioned thereon. The flower positioned on the pictorial representation having the numeral "1" associated therewith is then picked up from the matching template and inserted into the mounting block through the placement marking having the numeral "1" associated therewith. This process is repeated for each of the flowers on the matching template with respect to the associated numeral such that each flower on the matching template is removed therefrom in ascending order and placed in the foam block through the placement marking with the corresponding numeral associated therewith. The picture of the completed arrangement may generally be used as a guide to verify that the arrangement has been assembled correctly.

Once the arrangement is completely assembled, the assembler tears the placement template away from the mounting block and the flowers mounted thereon. Grasping tabs may be integrally formed on the placement template so as to extend beyond the outer periphery of the upper surface of the mounting block to provide a graspable surface to facilitate tearing away the placement template.

OBJECTS AND ADVANTAGES OF THE INVENTION

Therefore the objects of the present invention include: to provide a flower arrangement kit that is easy to assemble; to provide such a flower arrangement kit which includes a matching template having full scale pictorial representations of at least each flower type provided in the kit and with a distinct indicia associated with each pictorial representation; to provide such a kit which includes a placement template with placement markings thereon and which may be positioned relative to a mounting block to indicate where individual flowers associated with an indicia from the matching template are to be positioned or mounted relative to the mounting block; to provide such a kit in which the indicia comprise corresponding numerals associated with the pictorial representations on the matching template and the placement markings on the placement template; to provide such a kit in which the numerals on the placement template and the matching template comprise the numerals from "1" to the number of flowers to be utilized in the arrangement and indicate the order of placement of the flowers in the mounting block; to provide such a kit in which the placement template incorporates graspable tabs to facilitate tearing the placement template from the mounting block and the flowers inserted therethrough; to provide such a kit which includes all of the materials necessary to assemble the flower arrangement; and to provide such a kit which produces an attractive flower arrangement.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a flower arrangement kit of the present invention with the contents of the kit shown removed from a box for the kit.

FIG. 2 is an enlarged top plan view of an instruction sheet for the kit having a placement template printed thereon.

FIG. 3 is an enlarged and fragmentary front plan view of a tip of a flower of the kit.

FIG. 4 is an enlarged perspective view of a matching template of the present invention showing an assembler placing flowers on pictorial representations of the flowers in the kit.

FIG. 5 is a reduced perspective view showing an assembler inserting flowers into a foam block through placement markings on the placement template mounted on the foam block.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, an artificial flower arrangement kit 1 is shown in FIG. 1. The kit 1 includes a receptacle 5, such as a basket or vase, a mounting block 6, decorative elements or flowers 7, an instruction sheet 8 having a placement template 9 printed thereon (as shown in FIG. 2) and a matching template 10, all of which are packaged in a box 11 having a picture or illustration 12 printed thereon of a flower arrangement which can be produced by the kit 1.

The kit 1 incorporates decorative elements or flowers 7 of several types. In the embodiment shown herein, the decorative elements 7 utilized generally comprise, greenery such as pine boughs 7a, holly branches 7b, an orchid 7c and poinsettias 7d. Multiple pieces of the decorative elements 7a, 7b and 7d are shown bound together in groups in FIG. 1. It is to be understood that a wide range of artificial flower types or decorative elements could be utilized in kits 1 of the present invention, including flowers, greenery, berries, pine cones, balloons, figurines, card holders, or any other items utilized or suitable for use in flower arrangements or related decorative arrangements. It is also to be understood that for the purposes of this specification including the claims, the words "flower" and "decorative elements" may be used synonymously to include any of the flower arrangement elements discussed above.

The mounting block 6 is preferably of a relatively rigid, closed cell type foam which holds its shape, such as polystyrene, polyethylene or polyurethane. The mounting block 6 is provided in the kit 1 pre-cut or formed to a size adapted to be positioned within an open ended cavity or chamber 20 in the receptacle 5. An upper surface 22 of the mounting block 6 is shown in FIG. 1 with moss 23 glued thereto. The mounting block 6 may also be painted, colored or otherwise decorated to produce a visually appealing effect.

The flowers 7 are preferably of the wire type artificial flower which may be bent into a desired shape or orientation. A mounting tip 27 is secured to the lower end of a stem 28 of each flower 7. The mounting tips 27, as best shown in FIG. 3, include a point 30, a plurality of barbs 31 and a radial flange or stop 32 extending around the stem 28 above the barbs 31. The tips 27 facilitate insertion of the stems 28 into the mounting block 6. The barbs 31 then provide some resistance to removal of the stems 28 from the mounting block 6 and the stop 32 provides a reference as to the desired depth into which the tip 27 is to be inserted into the mounting block 6 and generally resists insertion of the tip 27 therebeyond. It is foreseen that the mounting tip 27 may be formed from a wide variety of materials including plastic molded onto the stem 28 or metal clamped onto the stem.

The instruction sheet 8 includes a listing of the kit contents 36 and instructions 37 for assembling the arrangement. The listing of the kit contents 36 and instructions 37 shown in FIG. 2 are simplified for the purpose of illustration. As noted above, the placement template 9 is also printed on the instruction sheet 8 with the outline of the placement template 9 shown in dotted lines along which the assembler is instructed to cut to remove the placement template 9 therefrom.

The placement template 9 includes a pair of tabs 40 extending from opposite sides thereof. The dimensions of the placement template 9 generally correspond to the dimensions of the upper surface 22 of the mounting block 6 such that when the placement template 9 is positioned thereon, the tabs 40 extend beyond an outer periphery thereof.

The placement template 9 also includes a plurality of placement markings or dots 41 through which the mounting tips 27 of the flowers 7 are to be inserted when the placement template 9 is positioned on the upper surface 22 of the mounting block 6. The placement markings 41 generally provide the pattern to be used in assembling the arrangement. Although the placement markings 41 are shown as dots printed on the placement template 9 it is foreseen that the markings 41 could comprise holes, bumps or indentations formed in the placement template 9 or other markings of various shapes or configurations.

A distinct placement numeral or indicia 42 is positioned in closely spaced relation to each placement marking 41. The placement numerals 42 preferably comprise the numbers "1" through the number of flowers 7 used. For example, if there are "11" flowers to be used in the arrangement, the placement numerals 42, comprise the numbers "1" through "11". The placement numerals 42 indicate the order in which the flowers 7 are to be inserted into the mounting block 6. It is foreseen that the mounting block 6 and the placement template 9 could be of a wide variety of shapes. Further it is foreseen that the placement template could simply comprise placement markings 41 and associated indicia 42 printed directly on the upper surface 22 of the mounting block 6. It is also foreseen that the placement template 9 could be printed on a sheet of paper by itself and without the listing of the kit contents 36 and the instructions The matching template 10 generally comprises a sheet of paper having a full scale pictorial representation 50 of each of the flowers 7 to be used in the arrangement printed thereon. The pictorial representations 50 may comprise outlines, sketches, illustrations, pictures or other representations of the flowers 7. The pictorial representations 50 are printed on the matching template 10 in spaced apart relation. A distinct matching numeral or indicia 52 is printed in close proximity to each pictorial representation 50. Each of the matching numerals 52 corresponds to one of the placement numerals 42 on the placement template 9.

The pictorial representations 50 and the matching numeral 52 associated therewith are generally arranged on the matching template in ascending order corresponding to the order in which the flowers 7 represented by the pictorial representations 50 are to be inserted into the mounting block 6.

It is foreseen that the matching template could only include one full scale pictorial representation 50 for each type of flower 7 to be used in the kit 1. In such a case the matching numeral 52 associated with each pictorial representation 50 would preferably comprise a plurality of matching numerals 52, the number of which would correspond to the number of individual flowers 7 of that specific type.

It is foreseen that other types of indicia could be used instead of the placement numerals 42 and the matching numerals 52. Such indicia could include letters or geometric shapes and various systems could be utilized to determine the order of assembly of the flowers 7 based on the indicia 42 and 52 utilized.

Utilization of the matching template 10 and the placement template 9 greatly facilitates assembly of the flower arrangement. After the contents of the kit 1 are removed from the box 11, the assembler 55 places the mounting block 6 in the cavity 20 of the receptacle 5. The placement template 9 is then cut from the instruction sheet 8 and placed on the upper surface 22 of the mounting block 6 with the placement markings 41 facing up as generally shown in FIG. 5. Pins 60 may also be provided with the kit 1 for use in pinning the placement template 9 to the mounting block 6.

The matching template 10 is laid out on a flat surface. The assembler 55 then places each flower 7 on a corresponding pictorial representation 50 as generally shown in FIG. 4. The pictorial representations 50 for specific flowers 7 may be bent, curved or shaped to indicate the preferred shape or orientation of the flower 7 in the arrangement. For example, the pictorial representations 50 for the holly branches 7d with the associated reference numerals "4", "6" and "9" are noticeably curved. The assembler 55 bends the flowers 7 to generally conform to the shape of these curved pictorial representations 50.

After all the flowers 7 are placed on the corresponding pictorial representations 50, the flowers 7 are removed from the matching template 10 in ascending order and inserted into the mounting block 6 through the corresponding placement marking 41 on the placement template 9. For example, the assembler 55 initially takes the flower 7 from the pictorial representation 50 having the numeral "1" associated therewith and inserts the tip 27 of the flower 7 into the mounting block 6 through the placement marking 41 having the numeral "1" associated therewith on the placement template 9. The assembler 55 then repeats this step by taking a flower 7 from each successive pictorial representation 50 and inserting the flower 7 into the mounting block 6 through the corresponding placement marking 41 until all of the flowers 7 are inserted into the mounting block 6.

When inserting the tips 27 of the flowers 7 into the mounting block 6, the assembler 55 preferably leaves a gap between the upper surface 22 of the mounting block 6 and the stop 32 such that the stop 32 does not press the placement template 9 against the upper surface 22 of the mounting block 6. After all of the flowers 7 are inserted in the mounting block 6, the assembler 55 then grabs the tabs 40 of the placement template 9 and tears the placement template 9 away from the mounting block 6 and the flowers 7 secured thereto. The assembler 55 then pushes the tips 27 of all of the flowers 7 further into the mounting block 6 until the stop 32 on each tip 27 abuts against the upper surface 22 of the mounting block 6.

Throughout the assembly process, the assembler 55 can use the picture 12 of the completed arrangement printed on the box 11 as a visual reference to verify that the arrangement is being assembled correctly and to provide a visual reference as to how the flowers 7 should be oriented relative to one another in their prescribed places.

Although the kit has been generally described as using artificial flowers, it is foreseen that the kit could be used with live or dried flowers. The placement template 9 and the matching template 10 along with the picture 12 of the flower arrangement to be achieved, might be sold as a package without the other items in the kit 1. The assembler 55 could then obtain the other items necessary to complete the arrangement including possibly live or dried flowers. In such a situation, the package would include a list of items to be obtained and the picture 12 and the matching template 10 would provide a visual reference to assist in the selection of items and cutting the flowers to the proper length. Further it is foreseen that the kit 1 might include all of the elements except the flowers 7 or other items.

It is to be understood that while certain forms of the present invention have been illustrated and described herein, it is not to be limited to the specific forms or arrangement of parts described and shown.

What is claimed and desired to be secured by Letters Patent is as follows:

1. A flower arrangement kit for assembling a plurality of preselected flower types into a flower arrangement including:

a. a placement template including a plurality of placement indicia; and b. a matching template including at least one approximately full scale pictorial representation of each flower type; each of said pictorial representations being positioned on said template in spaced apart relation and having a matching indicia associated therewith corresponding to one of said placement indicia on said placement template.

2. The flower arrangement kit as in claim 1 wherein:

a. said placement template includes a pair of tabs on opposite sides thereof.

3. The kit in claim 1 wherein said placement template further includes:

a. a plurality of placement markings each of which is associated with one of said placement indicia.

4. A flower arrangement kit including:

a. an assortment of flowers comprising a plurality of flower types and wherein the number of flowers in said kit is represented by the letter n;

b. a placement template including n placement indicia; and c. a matching template including at least one approximately full scale pictorial representation of each flower type; each of said pictorial representations being positioned on said template in spaced apart relation and having a matching indicia associated therewith corresponding to one of said placement indicia on said placement template.

5. The kit in claim 4 wherein said placement template further includes:

a. a plurality of placement markings each of which is associated with one of said placement indicia.

6. The flower arrangement kit as in claim 4 further comprising:

a. a mounting block wherein said placement template is sized for placement over an upper surface of said mounting block.

7. The flower arrangement kit as in claim 6 further comprising:

a. a decorative receptacle having an open cavity into which said mounting block may be positioned.

8. The flower arrangement kit as in claim 6 wherein:
   a. said placement template includes a pair of tabs on opposite sides thereof and which extend beyond an outer periphery of said upper surface of said mounting block when said placement template is positioned thereon.

9. A flower arrangement kit comprising:
   a. a plurality of flowers wherein the number of flowers in said kit is represented by the letter n;
   b. a placement template including n placement indicia; and
   c. a matching template including an approximately full scale pictorial representation of each flower; each of said pictorial representations being positioned on said template in spaced apart relation and having a matching indicia associated therewith corresponding to one of said placement indicia on said placement template.

10. The kit in claim 9 wherein said placement template further includes:
    a. a plurality of placement markings each of which is associated with one of said placement indicia.

11. The flower arrangement kit as in claim 9 wherein:
    a. said placement indicia comprise the numbers 1 to n; and
    b. said matching indicia associated with said pictorial representations comprise the numbers 1 to n.

12. The flower arrangement kit as in claim 11 wherein:
    a. said pictorial representations on said matching template are generally arranged in ascending order with respect to said matching indicia associated therewith.

13. The flower arrangement kit as in claim 9 further comprising:
    a. a mounting block wherein said placement template is sized for placement over an upper surface of said mounting block.

14. The flower arrangement kit as in claim 13 further comprising:
    a. a decorative receptacle having an open cavity into which said mounting block may be positioned.

15. The flower arrangement kit as in claim 13 wherein:
    a. said placement template includes a pair of tabs on opposite sides thereof and extending beyond an outer periphery of said upper surface of said mounting block when said placement template is positioned thereon.

16. A method of assembling a plurality of flowers into a flower arrangement comprising the steps of:
    a. placing a placement template on a mounting block wherein said placement template includes placement markings and placement indicia associated with each placement marking;
    b. matching each of said flowers with an approximately full scale pictorial representation of said respective flower on a matching template wherein each said pictorial representation has a matching indicia associated therewith; and
    c. mounting each of said flowers on said mounting block at the placement marking having the placement indicia which corresponds to the matching indicia for the pictorial representation with which each of said respective flowers was matched.

17. The method as in claim 16 wherein:
    a. said flowers are mounted on said mounting block in ascending order with respect to said corresponding placement indicia and matching indicia on said placement template and said matching template respectively.

18. The method as in claim 16 further comprising the step of:
    a. conforming the shape of each of said flowers to the shape of said pictorial representation with which said flower matches.

* * * * *